Patented Sept. 23, 1952

2,611,752

UNITED STATES PATENT OFFICE 2,611,752

TACKIFIERS AND SOFTENERS FOR SYNTHETIC RUBBERS AND COMPOSITIONS CONTAINING THE SAME

Robert H. Barth, Ridgewood, N. J., assignor to Heyden Chemical Corporation, New York, N. Y., a corporation of Delaware No Drawing. Original application November 13, 1944, Serial No. 563,310, now Patent No. 2,516,104, dated July 25, 1950. Divided and this application July 21, 1950, Serial No. 175,291

18 Claims. (Cl. 260—27)

My invention relates particularly to new and novel chemical compounds and to compositions comprising said new compounds and synthetic rubbers, such as copolymers of diolefins and styrene and copolymers of diolefins and acrylonitrile. In one of its more specific aspects it relates to acetals of partial esters of certain polyhydric alcohols, such as the diabietic acid ester of pentaerythritol butyral, which are especially advantageous tackifiers and tack-imparting or tackifying softeners of synthetic rubbers. This application is a division of the application upon Resin-Acid Ester-Acetals of Polyhydric Alcohols, Ser. No. 563,310, filed November 13, 1944, which is a continuation in part of the prior copending application Ser. No. 525,592, filed March 8, 1944, which issued as Patent No. 2,446,257.

Synthetic rubbers, such as copolymers of butadiene and styrene (Buna-S or GR-S) and copolymers of butadiene and acrylonitrile (Buna-N, Hycar-OR, or GR-A) and the like, differ from natural rubber in many respects, especially in the quantities and types of compounding ingredients which must be incorporated therewith and in the compound procedures which must be used to produce automobile tires and other useful articles therefrom. Carbon black, for example, must be incorporated in greater quantities in synthetic rubber of the GR-S type than in natural rubber to produce automobile tires, and special grades of carbon black must be used for the purpose. Different vulcanizing agents, softening agents and the like are also used. Softeners are generally used with both natural and synthetic rubber but, when used with these synthetic rubbers, greater proportions are required and the effects produced may be generally different from those produced in natural rubber.

When natural rubber is milled with compounding ingredients in the conventional manner the material coheres and possesses considerable inherent tackiness. On the other hand, these synthetic rubbers do not readily cohere and do not have as much inherent tackiness as natural rubber. Softeners added to synthetic rubbers may improve the plasticity of the mass without affecting the tackiness substantially; for the most part they must be used in such quantities as to destroy at least partially what little inherent tackiness is possessed by the synthetic rubber. As a consequence, the industry has long sought softeners that improve the tackiness or coherence of synthetic rubbers and permit it to be milled and treated in much the same manner as natural rubber or substances which, when added to conventional synthetic rubber compositions, improve the tackiness of the resulting compositions, especially during milling.

It is a principal object of the present invention to provide a tackifier for synthetic rubber compositions, such as those produced from copolymers of butadiene and styrene and copolymers of butadiene and acrylonitrile.

It is a further object to provide a tackifier for such synthetic rubber compositions that will retain a considerable portion of its effectiveness after vulcanization of the compositions.

A further object of the invention is to provide a material which may be used as both a softening and a tackifying ingredient for compositions comprising such synthetic rubbers.

Other objects and advantages of the invention, some of which are referred to more specifically hereinafter, will be apparent to those skilled in the art to which the invention pertains.

I have discovered that the foregoing objects are realized to a remarkable degree by the use of certain new and novel compounds which I described in the copending application Ser. No. 525,392, filed March 8, 1944, which issued as Patent No. 2,446,257. These compounds are exemplified by pentaerythritol diabietate butyral, which may possibly be representable structurally as:

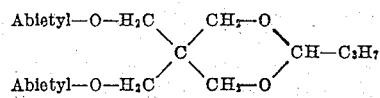

and which is the reaction product of 2 mols of abietic acid (rosin), 1 mol of pentaerythritol and 1 mol of butyraldehyde. Other compounds of this type which possess these desirable properties may be prepared from other acids of the type of abietic acid, other polyhydric alcohols, other aldehydes, and in other molecular proportions, as specified hereinafter.

The compounds or products to which the present invention is specifically directed may be prepared generally by partial esterification of glycerol, pentaerythritol, a polypentaerythritol, or mixtures thereof, which abietic acid or a similar acid or a material, such as tall oil, containing a substantial proportion of such acids. This esterification may be effected by heating the two materials in the presence of a catalyst but it normally proceeds sufficiently rapidly without a catalyst in the temperature range from approximately 180° to approximately 300° C. or somewhat higher. Catalysts which may be used, if desired, are sulfuric acid, p-toluenesulfonic acid, resinates and naphthenates of lithium, calcium, strontium, barium, zinc and cadmium and other soluble salts of these metals, as described in Burrell Patent No. 2,360,394, and the like. When pentaerythritol esters are being prepared, care should be exercised not to overheat the pentaerythritol before the esterification has proceeded to a substantial extent, since overheating may result in the decomposition of the pentaerythritol with the formation of dark-colored products and undesirable byproducts. After the partial ester has been formed it is then reacted with an aldehyde to produce an acetal.

The reaction of the partial ester with the aldehyde may be conducted by heating the two materials together in the presence of an acid catalyst, such as oxalic acid, hydrochloric acid, sulfuric acid or the like. It is desirable to add an inert solvent such as toluene or a saturated aliphatic hydrocarbon or petroleum fraction to prevent foaming and to aid in removing the water formed in the reaction. As the acetalization proceeds, the reaction temperature may be raised. It is generally desirable to conduct the acetalization in an apparatus provided with a reflux condenser, separator or trap, and a return line, and to effect the heating in the presence of toluene or other solvent which is immiscible with water but which forms an azeotrope with water. By using such an apparatus and such a solvent, the reactants can be heated under gentle reflux and the temperature can be more readily controlled. In operating in this manner, the condensed reflux liquid is collected in the separator or trap, the water is separated therefrom periodically, and the toluene is returned to the reaction mass. At the end of the acetalization the solvent can be removed by volatilization, preferably at reduced pressure, that is, by vacuum distillation.

Instead of preparing the partial ester by heating the acid and polyhydric alcohol together in the desired stoichiometric proportions a complete ester may be used as the starting material. The complete ester may be alcoholized with glycerol, pentaerythritol or a polypentaerythritol, in the presence of catalysts, if desired, to form the partial ester. Thus pentaerythritol tetra-abietate may be reacted with pentaerythritol to produce pentaerythritol diabietate in the presence of catalysts such as are disclosed in Burrell Patent No. 2,360,394.

Although, in the preparation of compounds for use as tackifiers from pentaerythritol, in accordance with the process of the present invention, it is generally desirable to have two of the hydroxyl radicals of pentaerythritol esterified by abietic acid or its equivalent and the remaining two acetalized by the aldehyde, these proportions may be varied considerably. With pentaerythritol, satisfactory products may be obtained from the reaction of one molecular equivalent to three molecular equivalents of abietic acid and the acetalization of the remaining hydroxyl groups. With dipentaerythritol, which contains six hydroxyl groups per molecule, from one to five of the hydroxyl groups may be esterified with abietic acid and the remaining hydroxyl groups may be acetalized. When glycerol is used as the starting material, either one or two hydroxyl groups may be acetalized.

The composition of the products which are formed has not definitely established but obviously they are somewhat more complex than indicated by the probable structure of pentaerythritol diabietate butyral as given hereinabove. The products may be pure compounds or mixtures of pure compounds, in which there may be cross-linkages between the original polyhydric alcohol nuclei through the acetal group. A possible compound, for example, which has such cross-linkages and also has the same empirical composition as pentaerythritol diabietate butyral, is:

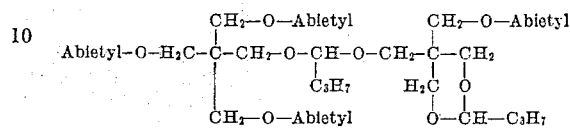

which is a dipentaerythritol tetra-abietate dibutyral.

The order of the esterification and acetalization may be reversed but esterification prior to acetalization is recommended and preferred because of its simplicity.

Instead of using pure abietic or sylvic acid in the production of the tackifiers or tackifying softeners of the present invention, rosin of various grades or degrees of purity may be used. Pure abietic acid has an acid number of 162, whereas grade B wood rosin, which may also be used as a starting material, may have an acid number as low as 110. Of course, compensation for these differences should be made, for example, by using these acid numbers in computing the quantities of the polyhydric alcohol to be used for esterification. Tall oil or tallol, which is rich in resin acids, containing as much as 40% by weight of these acids which include substantial amounts of Steele's abietic acid and d-pimaric acid, may also be used to replace abietic acid, either partially or completely. Other acids of the type of abietic acid which may be used for partial or complete replacement of abietic acid are levopimaric acid, d-pimaric acid and Palkin acids.

Glycerol, pentaerythritol, polypentaerythritols and mixtures thereof are the preferred polyhydric alcohols for use in producing the compounds of the invention. Dipentaerythritol and tripentaerythritol are two of the polypentaerythritols which have been definitely isolated and identified. Pleopentaerythritol, one of the products that can be isolated from the condensation of formaldehyde and acetaldehyde in the presence of an alkali, and which has a melting point of 230° to 240° C. and a hydroxyl content of 33%, possesses some of the attributes of a pure compound, but is a mixture of dipentaerythritol and tripentaerythritol with other hydroxylated products. Tetrapentaerythritol and higher polypentaerythritols have been postulated at the present time.

The polyhydric alcohols which may be used for the production of tackifying compounds in accordance with the invention are relatively restricted. Thus, ethylene glycol, propylene glycol, diethylene glycol and the like do not produce compounds which exhibit to any substantial extent the desirable properties possessed by acetals of abietic esters of glycerol, pentaerythritol and polypentaerythritols. The effect of using a diethylene glycol diabietate butyral in a butadiene-styrene copolymer is illustrated in the preparation entitled Comparison Composition 1 hereinafter.

The aldehydes which may be used in the production of the acetals of abietic acid esters of polyhydric alcohols in accordance with the process of the invention are formaldehyde, acetaldehyde, propionaldehyde, butyraldehyde and other aliphatic aldehydes having up to and including eight carbon atoms in the molecule. Aromatic aldehydes such as benzaldehyde may also be used. Instead of using an aldehyde itself, the starting material may be a partially acetalized polyhydric alcohol, for example, a mixture of formals of pentaerythritol and polypentaerythritols such as is formed as a byproduct in the production of pentaerythritol and polypentaerythritols by the condensation of formaldehyde and acetaldehyde in the presence of an alkaline catalyst.

The preferred products of the invention are those in which all the hydroxyl groups of the polyhydric alcohol have been combined, that is, some with abietic acid or its equivalents and some with an aldehyde. However, compounds with a free hydroxyl group or mixtures containing some compounds having uncombined hydroxyl groups, as well as compounds of this type in which one or more of the hydroxyl groups has been esterified by acetic acid or other aliphatic or aromatic acids, may be used also.

Although the acetals of abietic esters of polyhydric alcohols which are described herein are especially adapted for use with synthetic rubbers of the types represented by copolymers of butadiene and styrene (GR–S) and copolymers of butadiene and acrylonitrile (GR–A), they may be used generally with all synthetic rubbers which are copolymers of a 1,3-butadiene hydrocarbon and another unsaturated compound which contains a $CH_2=C=$ group and is copolymerizable therewith.

In the following examples, which are not to be construed as limitative of the invention, are described methods of preparing suitable compounds for use as tackifying agents in accordance with the process of the invention. Following these examples are illustrated typical compositions containing synthetic rubber and these tackifying agents and results of vulcanizing or curing tests of such compositions.

*Example 1.—Pentaerythritol diabietate butyral*

A mixture of 2000 parts of rosin (acid number=162) and 417 parts of technical pentaerythritol (hydroxyl value=46.5%; combining weight=36), was heated for two hours at 280° C. under an atmosphere of carbon dioxide. The mixture was then cooled to approximately 80° C. and 236 parts of butyraldehyde were slowly added. During the slow addition of the butyraldehyde, concentrated hydrochloric acid was added dropwise until 55 parts had been added. Then 250 parts of toluene were added and the mixture heated gently under reflux with progressively increasing temperature, in an apparatus in which the reflux condenser was connected to a trap in which the condensed toluene-water azeotrope collected. The water was separated and removed periodically from the trap and the toluene was returned to the reaction mixture. After no further substantial quantity of water collected in the trap, the toluene was removed from the reaction mass by vacuum distillation.

The product was a heavy oil which solidified on cooling to a hard, brown, glassy and brittle substance having a low softening point (60° C. or higher).

Methods of compounding this product with copolymers of butadiene and styrene (see Composition 1 hereinafter) and butadiene and acrylonitrile (see Composition 2 hereinafter) are described hereinafter and the effects produced in such copolymers are tabulated in Table 1.

*Example 2.—Pentaerythritol diabietate butyral*

A mixture of 900 parts of resinous pentaerythritol diabietate and 90 parts of butyraldehyde was heated to 105° C. Then 1.5 parts of oxalic acid were added and the mixture was heated at approximately 100° C. for two hours. Most of the water formed in the reaction was removed during this period. To the reaction mass were then added 100 parts of toluene and the mixture was heated under gentle reflux in an apparatus similar to that described in Example 1, in such manner that the water which distilled over as an azeotrope with toluene was separated from the toluene and periodically removed. After about five hours of heating, during which time the temperature rose from 100° to 150° C., the toluene was removed together with the remaining water.

The resulting product was substantially identical with that formed in Example 1.

*Example 3.—Pentaerythritol diabietate benzal*

Pentaerythritol diabietate benzal, the benzal of the partial abietic acid ester of pentaerythritol, was prepared by reacting pentaerythritol with sufficient wood rosin to esterify approximately one-half of the hydroxyl groups of the pentaerythritol by abietic acid. The mixture of rosin and pentaerythritol was heated slowly to 280° C. in 3 hours. An atmosphere of carbon dioxide gas was maintained over the batch to prevent the formation of oxidation products that darken the color.

The resulting diabietate of pentaerythritol was then reacted with sufficient benzaldehyde to acetalize the remaining hydroxyl groups of the pentaerythritol by heating the mixture together with a small proportion of hydrochloric acid under gentle reflux for 1 hour. A small amount of toluene was added prior to heating the reaction mixture in order to suppress foaming. The unreacted benzaldehyde, water and toluene were then distilled from the batch by heating at 200° C. for 30 minutes.

The product was a hard, brown-colored, homogeneous friable solid that retained a slight odor of benzaldehyde. The yield as 88% of the theoretical.

The effects produced by using this product in the compounding of a synthetic rubber consisting of a butadiene-styrene copolymer (Composition 3) are tabulated in Table 2 hereinafter.

*Example 4.—Glycerol abietate butyral*

Four equivalents (124 grams) of glycerol were heated with 2 equivalents (690 grams) of wood resin at 250° C. for 2 hours in a flask equipped with a mechanical stirrer, thermometer and a steam-jacketed condenser. The mixture was thereafter cooled to 140° C., a water-jacketed condenser substituted for the steam-jacketed condenser, and 3 equivalents (108 grams) of butyraldehyde were added together with a small proportion (25 grams) of concentrated hydrochloric acid. The mixture was heated under gentle reflux for 2 hours, during which time the temperature of the batch increased from 83° to 96° C. The water of reaction, unreacted butyraldehyde and unreacted glycerol were then removed by vacuum distillation at a pressure of 5 mm., during which the temperature rose to 150° C.

The product was a dark brown-colored viscous liquid that retained a slight odor of butyraldehyde.

The effects produced by incoporating this product in a butadiene-styrene copolymer (Composition 4) are tabulated in Table 2 hereinafter.

*Comparison Example 1.—Diethylene glycol diabietate butyral*

The diabietate of diethylene glycol was prepared by heating together at 220° C. for 3 hours a mixture consisting of 318 grams of diethylene glycol and 1035 grams of wood rosin, color N (acid value=162).

The diabietate of diethylene glycol was then heated under reflux for 4 hours with a stoichiometric excess of butyraldehyde in the presence of 20 grams of concentrated hydrochloric acid. The unreacted butyraldehyde and water of reaction were then distilled off at a pressure of 5 to 15 mm.

The product was a viscous brown-colored liquid having a slight odor of butyraldehyde.

Results obtained on compounding this product with a butadiene-styrene copolymer (Comparison composition 1) are tabulated hereinafter in Table 2.

*Example 5.—Half-abietates of mixed formals and butyrals of pentaerythritol and polypentaerythritols*

In this example is used a mixture of partial formals of pentaerythritol and polypentaerythritols that was obtained as a byproduct in the manufacture of pentaerythritol by the condensation of formaldehyde and acetaldehyde in the presence of an alkaline catalyst, which was recovered in accordance with the process described in the application for patent Ser. No. 484,242, filed April 23, 1943, by Karl A. Fisher and Harry Burrell, and which is therein referred to as "B-liquor."

To 495 parts by weight of the above mixture of formals was added 2000 parts of wood rosin, grade N, which is sufficient to esterify approximately one-half of the hydroxyl equivalent of the mixture, and the mixture was heated for 3 hours at 280° C. The resulting product was then cooled to approximately 100° C. and 240 parts by weight of butyraldehyde and 5 parts by weight of concentrated hydrochloric acid (35% HCl) were added. This mixture was then heated under total reflux for 4 hours. The unreacted butyraldehyde and volatile products were removed by distillation at a pressure of several millimeters.

The product was a light amber-colored solid that was tacky and very cohesive.

Incorporation of the product into butadiene-styrene copolymers (Composition 5) and the effects produced therein are tabulated in Table 3 hereinafter.

*Example 6.—Quarter-abietates of mixed formals and butyrals of pentaerythritol and polypentaerythritols*

Example 5 was repeated but the proportions of reactants were varied so that only half as much rosin was used for the esterification of the mixture of partial formals of pentaerythritol and polypentaerythritols. The remaining hydroxyl groups were acetalized with butyraldehyde.

The effectiveness of this product as compared with that of Example 5 when used in butadiene-styrene copolymers (Composition 6) is shown in Table 3 hereinafter.

*Example 7.—Tall-oil esters of mixed formals and butyrals of pentaerythritol and polypentaerythritols*

A mixture of partial formals of pentaerythritol and polypentaerythritols such as was used in Example 5 was esterified with clay-treated tall oil ("Trostol," a tall oil marketed by Champion Fibre and Paper Co.) that had the following characteristics:

| | | |
|---|---|---|
| Acid number | | 163 |
| Resin acids | per cent | 45.2 |
| Fatty acids | do | 47.3 |
| Combining weight | | 345 |
| Sterols, etc. | per cent | 7.0 |
| Moisture | do | 0.6 |
| Ash | do | 0.35 |

One hundred seventy (170) parts by weight of the tall oil were mixed with 748 parts by weight of the mixture of partial formals and heated for 2 hours at 275° C. The product was then reacted with butyraldehyde in excess and recovered as in Example 5.

The product consisted of a dark brown-colored viscous liquid.

The effects produced on incorporating the product into a butadiene-styrene copolymer (Composition 7) are tabulated in Table 3.

In general, pentaerythritol diabietate butyral and related compounds, to which the present specification is directed, are hard, brittle resinous solids which are generally brown in color, have low melting points or ranges, and low acid numbers (approximately 10 or less). They are soluble in various solvents, such as acetone, xylene, benzene and toluene, and are compatible with linseed oil, petroleum oils, natural and synthetic rubbers and with natural and synthetic resins. They are also compatible with rosin and waxes and may be used as ingredients in the production of sealing wax and similar compositions.

When added to synthetic rubber compositions comprising such materials as butadiene-acrylonitrile and butadiene-styrene copolymers in amounts up to approximately 2 to 3% by weight of the copolymer, pentaerythritol diabietate butyral and related compounds greatly improve the milling characteristics. In amounts up to approximately 40% by weight of the copolymer, the uncured synthetic rubber compositions possess considerable tack and show "long fingers" but the cured rubber will not be sticky and will retain good nerve. With greater amounts, in excess of approximately 40% by weight of the copolymer, pronounced tack, softening and plasticizing are produced and this tack is retained to a considerable extent after curing or vulcanization. These effects are produced without other significant changes in the properties of the rubber compositions, but the curing time of the composition is generally retarded slightly.

In using pentaerythritol diabietate butyral and the related tackifying compounds of the present invention in the production of synthetic rubber compositions, conventional compounding procedures may be adopted. Except for providing for slightly increased curing periods, no substantial changes in compounding or curing procedures are required. Generally it is desirable to incorporate the tackifying compound directly with the copolymer on the rubber mill by breaking down the copolymer at a suitable temperature, for example, 38° C. (100° F.), and adding the tackifying compound thereto. The additional compounding ingredients may subsequently be incorporated or blended therein. The temperature at which the milling is most advantageously conducted will be dependent upon the amount of tackifying compound that is added. In some cases it may be necessary to cool or chill the rolls below normal operating temperature because of the softness of the composition.

Preferred methods of compounding the tackifying compounds of the invention and typical synthetic rubber compositions containing such compounds are illustrated in the examples which follow:

cured at a temperature of 300° F. for periods of 15, 30 and 60 minutes, respectively, and the physical properties of the products were determined. In both cases the tackifier was very readily incorporated, the uncured composition had excellent tack, and the vulcanized product was free from tack.

Identical compositions prepared by the incorporation of dibutyl phthalate instead of the pentaerythritol diabietate butyral were also tested for comparison.

The results are as follows:

TABLE 1

| Product | Minutes Cure at 300° F. | Modulus, pounds per square inch, at percent Elongation | | | Ultimate Tensile Strength, pounds per sq. inch | Ultimate Elongation, percent | Shore Durometer Hardness |
|---|---|---|---|---|---|---|---|
| | | 300% | 500% | 700% | | | |
| Butadiene-Styrene Rubber-Pentaerythritol Diabietate Butyral (Composition 1.) | 15 | 335 | 670 | 950 | 1,330 | 870 | 55 |
| | 30 | 490 | 890 | 1,380 | 1,570 | 780 | 55 |
| | 60 | 680 | 1,140 | -------- | 1,640 | 690 | 60 |
| Butadiene-Acrylonitrile Rubber, Pentaerythritol Diabietate Butyral (Composition 2.) | 15 | 541 | 1,083 | 1,745 | 2,205 | 860 | 65 |
| | 30 | 730 | 1,510 | 2,440 | 2,700 | 750 | 70 |
| | 60 | 910 | 2,160 | -------- | 3,140 | 670 | 70 |
| Butadiene-Styrene Rubber-Dibutyl Phthalate | 15 | 450 | -------- | -------- | 825 | 480 | 50 |
| | 30 | 502 | -------- | -------- | 1,030 | 460 | 55 |
| | 60 | 690 | -------- | -------- | 1,145 | 440 | 55 |
| Butadiene-Acrylonitrile Rubber-Dibutyl Phthalate | 15 | 160 | 320 | 530 | 770 | 940 | 45 |
| | 30 | 200 | 500 | 705 | 1,150 | 990 | 50 |
| | 60 | 330 | 650 | 1,010 | 1,725 | 920 | 55 |

Composition 1

One hundred (100) parts by weight of a butadiene-styrene copolymer (GR-S) rubber were rolled on a rubber mill at a temperature of 38° C. (100° F.). While being thus subjected to "break down," 25 parts by weight of the pentaerythritol diabietate butyral tackifying compound prepared as described in Example 1 were added in small proportions during the milling. The composition milled easily and became tacky during the mixing. After the tackifying compound had been thoroughly distributed and incorporated, a mixture of 50 parts by weight of channel black and 5 parts by weight of zinc oxide, 1.25 parts by weight of sulfur powder (flowers of sulfur) and 1.25 parts by weight of a commercial accelerator (Altax) were added during continued milling. The composition was then removed from the rolls and was subjected to vulcanization tests.

The product is sticky and tacky during milling but is free from tack after vulcanization. Physical characteristics of vulcanized products prepared from this composition are tabulated in Table 1 hereinafter.

Composition 2

The foregoing example was repeated but, instead of using a butadiene-styrene copolymer, the composition was prepared from a butadiene-acrylonitrile copolymer (GR-A) sold under the trade-name "Hycar OR-15." The tackifier was readily incorporated in this manner and the product before curing had excellent tack but was free from tack after vulcanization.

Physical characteristics of the vulcanized products prepared from this composition are tabulated in Table 1 hereinafter.

Curing tests of Compositions 1 and 2

Portions of the synthetic rubber compositions prepared in Compositions 1 and 2 above were

Composition 3

A butadiene-styrene copolymer (GR-S) composition was prepared from the following:

100 parts by weight of butadiene-styrene copolymer (GR-S)
25 parts by weight of pentaerythritol diabietate benzal (Example 3)
50 parts by weight of channel black
5 parts by weight of zinc oxide
2 parts by weight of sulfur
2 parts by weight of accelerator (Altax)

The milling and incorporation was effected as described in Composition 1 hereinabove. The curing and physical characteristics of vulcanized products prepared from this composition are tabulated in Table 2 hereinafter.

Composition 4

A composition was prepared exactly as Composition 3 except that the glycerol abietate butyral of Example 4 was used instead of pentaerythritol diabietate benzal.

Physical characteristics of vulcanized products prepared from this composition are tabulated in Table 2 hereinafter.

Comparison composition 1

A composition was prepared exactly as Composition 3 except that the diethylene glycol diabietate butyral of Comparison Example 1 was substituted for pentaerythritol diabietate benzal, weight for weight.

Physical properties of cured products prepared from this composition are tabulated in Table 2 hereinafter.

Curing tests of Compositions 3 and 4 and Comparison composition 1

The results of curing tests of the three foregoing compositions, which were conducted in the same manner as the curing tests of Compositions 1 and 2, are tabulated in Table 2. For comparison, the results obtained in such tests with Composition 1 are included. It is to be noted, however, that Composition 1 was prepared with a smaller proportion of sulfur and accelerator.

TABLE 2

| Product Compounded with GR-S | Minutes Cure at 300° F. | Modulus, pounds per square inch, at percent Elongation | | | Ultimate Tensile Strength, pounds per sq. inch | Ultimate Elongation, percent | Shore Durometer Hardness |
|---|---|---|---|---|---|---|---|
| | | 300% | 500% | 700% | | | |
| Pentaerythritol | 15 | 335 | 670 | 950 | 1,330 | 870 | 55 |
| Diabietate Butyral | 30 | 490 | 890 | 1,380 | 1,570 | 780 | 55 |
| (Composition 1) | 60 | 680 | 1,140 | | 1,640 | 690 | 60 |
| Pentaerythritol | 15 | 500 | 880 | 1,400 | 1,875 | 800 | 55 |
| Diabietate Benzal | 30 | 760 | 1,310 | | 1,785 | 600 | 60 |
| (Composition 3) | 60 | 760 | 1,330 | | 1,770 | 590 | 60 |
| Glycerol Abietate | 15 | 545 | 1,000 | 1,530 | 1,780 | 770 | 55 |
| Butyral | 30 | 800 | 1,340 | | 1,600 | 530 | 60 |
| (Composition 4) | 60 | 510 | 1,000 | 1,450 | 1,810 | 775 | 50 |
| Diethylene Glycol | 15 | 800 | 1,520 | | 1,530 | 500 | 55 |
| Diabietate Butyral | 30 | 706 | 1,360 | | 1,530 | 495 | 55 |
| (Comparison Composition 1) | 60 | 745 | 1,370 | | 1,430 | 500 | 55 |

In all cases, except that of Comparison composition 1, which is that prepared from a butadiene-styrene copolymer and diethylene glycol diabietate butyral, the tackifying ingredient was incorporated very readily by the procedure described and all the compositions possessed excellent tack during milling except Comparison composition 1. Diethylene glycol diabietate butyral is quite unsatisfactory for use as a tackifying ingredient for synthetic rubber in accordance with the process of the present invention.

In all compositions, including Comparison composition 1, no tackiness or only slight tackiness remained in the respective products after curing at 300° F. for the specified intervals.

From the above results it will be noted also that the curing time is slightly accelerated in the case of Composition 3 (that made with the benzal of pentaerythritol diabietate) and that curing of the others, except Comparison composition 1, was slightly retarded by the presence of the tackifying ingredient in the compositions.

*Composition 5*

A composition was prepared exactly as Composition 3 except that the half-abietates of mixed formals and butyrals of pentaerythritol and polypentaerythritols of Example 5 were used, weight for weight, as the tackifying ingredient, in place of pentaerythritol diabitate benzal.

*Composition 6*

The quarter-abietates of mixed formals and butyrals of pentaerythritol and polypentaerythritols of Example 6 were substituted, weight for weight, for the tackifying ingredient used in Composition 3 and in other respects the composition was prepared as described in Example 3.

*Composition 7*

The tall-oil esters of mixed formals and butyrals of pentaerythritol and polypentaerythritols whose preparation is described in Example 7 were substituted, weight for weight, for the tackifying ingredient used in Composition 3 and in other respects the composition was prepared as described in Example 3.

*Curing tests of Compositions 5, 6 and 7*

The results of curing tests of the three foregoing compositions, which were conducted in the same manner as the curing tests of Compositions 1 and 2, are tabulated in Table 3. For comparison, the results obtained in such tests with Composition 1 are included.

TABLE 3

| Product Compounded with GR-S | Minutes Cure at 300° F. | Modulus, pounds per square inch, at percent Elongation | | | Ultimate Tensile Strength, pounds per sq. inch | Ultimate Elongation, percent | Shore Durometer Hardness |
|---|---|---|---|---|---|---|---|
| | | 300% | 500% | 700% | | | |
| Pentaerythritol | 15 | 335 | 670 | 950 | 1,330 | 870 | 55 |
| Diabietate Butyral | 30 | 490 | 890 | 1,380 | 1,570 | 780 | 55 |
| (Composition 1) | 60 | 680 | 1,140 | | 1,640 | 590 | 60 |
| Half-Abietates of | 15 | 364 | 912 | 1,830 | 2,500 | 910 | 65 |
| "B-Liquor" Butyrals | 30 | 725 | 1,630 | 2,420 | 2,530 | 750 | 70 |
| (Composition 5) | 60 | 1,265 | 2,330 | | 2,730 | 560 | 70 |
| Quarter-Abietates of | 15 | 590 | 1,080 | | 1,600 | 620 | 60 |
| "B-Liquor" Butyrals | 30 | 640 | 1,100 | | 1,380 | 550 | 60 |
| (Composition 6) | 60 | 710 | 1,235 | | 1,680 | 550 | 60 |
| Tall-Oil Esters of | 15 | 460 | 740 | | 945 | 530 | 50 |
| "B-Liquor" Butyrals | 30 | 650 | | | 1,190 | 490 | 55 |
| (Composition 7) | 60 | | 300 | 440 | 590 | 840 | 45 |

In all the above compositions (1, 5, 6 and 7) the tackifying ingredient was incorporated very readily by the procedure described and all the compositions possessed excellent tack during milling. No tackiness or only slight tackiness remained in the respective products after curing at 300° F. for the specified intervals, although the sample of Composition 7 that was cured for 60 minues was slightly but definitely tacky. Increasing the time of curing appears to favor development of after-curing tackiness in synthetic rubber composition comprising the tackifiers of the invention.

In all the above compositions (1, 5, 6 and 7) the curing time was slightly retarded by the addition of the tackifiers, being least retarded by the tall-oil esters of mixed formals and butyrals of pentaerythritol and polypentaerythritols (Composition 7).

Although the foregoing description comprises preferred embodiments of the invention, it is to be understood that the invention is not limited thereto and that modifications and variations may be made therein without departing substantially from the principles or scope of the invention.

I claim:
1. A tall-oil ester obtained by reacting tall-oil with a mixture of partial formals of pentaeryth- ritol and polypentaerythritols produced in the manufacture of pentaerythritol by the condensation of formaldehyde and acetaldehyde in the presence of an alkaline catalyst and by reacting the product thus obtained with butyraldehyde.

2. A tall-oil ester obtained by reacting tall-oil with a mixture of partial formals of pentaerythritol and polypentaerythritols produced in the manufacture of pentaerythritol by the condensation of formaldehyde and acetaldehyde in the presence of an alkaline catalyst and by reacting the product thus obtained with butyraldehyde in the presence of an acid catalyst.

3. A tall-oil ester, substantially free from unreacted butyaldehyde and volatile products, obtained by reacting tall-oil with a mixture of partial formals of pentaerythritol and polypentaerythritols produced in the manufacture of pentaerythritol by the condensation of formaldehyde and acetaldehyde in the presence of an alkaline catalyst and by reacting the product thus obtained with butyraldehyde.

4. A tall-oil ester, substantially free from unreacted butyraldehyde and volatile products, obtained by reacting tall-oil with a mixture of partial formals of pentaerythritol and polypentaerythritols produced in the manufacture of pentaerythritol by the condensation of formaldehyde and acetaldehyde in the presence of an alkaline catalyst and by reacting the product thus obtained with butyraldehyde in the presence of an acid catalyst.

5. A dark brown viscous liquid tall-oil ester obtained by reacting tall-oil with a mixture of partial formals of pentaerythritol and polypentaerythritols produced in the manufacture of pentaerythritol by the condensation of formaldehyde and acetaldehyde in the presence of an alkaline catalyst and by reacting the product thus obtained with butyraldehyde.

6. A dark brown viscous liquid tall-oil ester obtained by reacting tall-oil with a mixture of partial formals of pentaerythritol and polypentaerythritols produced in the manufacture of pentaerythritol by the condensation of formaldehyde and acetaldehyde in the presence of an alkaline catalyst and by reacting the product thus obtained with butyraldehyde in the presence of an acid catalyst.

7. A rubber-like composition containing a butadiene copolymer artificial rubber and a tall-oil ester obtained by reacting tall-oil with a mixture of partial formals of pentaerythritol and polypentaerythritols produced in the manufacture of pentaerythritol by the condensation of formaldehyde and acetaldehyde in the presence of an alkaline catalyst and by reacting the product thus obtained with butyraldehyde.

8. A rubber-like composition containing a butadiene copolymer artificial rubber and a tall-oil ester obtained by reacting tall-oil with a mixture of partial formals of pentaerythritol and polypentaerythritols produced in the manufacture of pentaerythritol by the condensation of formaldehyde and acetaldehyde in the presence of an alkaline catalyst and by reacting the product thus obtained with butyraldehyde in the presence of an acid catalyst.

9. A rubber-like composition containing a butadiene copolymer artificial rubber and a tall-oil ester, substantially free from unreacted butyraldehyde and volatile products, obtained by reacting tall-oil with a mixture of partial formals of pentaerythritol and polypentaerythritols produced in the manufacture of pentaerythritol by the condensation of formaldehyde and acetaldehyde in the presence of an alkaline catalyst and by reacting the product thus obtained with butyraldehyde.

10. A rubber-like composition containing a butadiene copolymer artificial rubber and a tall-oil ester, substantially free from unreacted butyraldehyde and volatile products, obtained by reacting tall-oil with a mixture of partial formals of pentaerythritol and polypentaerythritols produced in the manufacture of pentaerythritol by the condensation of formaldehyde and acetaldehyde in the presence of an alkaline catalyst and by reacting the product thus obtained with butyraldehyde in the presence of an acid catalyst.

11. A rubber-like composition containing a butadiene copolymer artificial rubber and a dark brown viscous liquid tall-oil ester obtained by reacting a tall-oil with a mixture of partial formals of pentaerythritol and polypentaerythritols produced in the manufacture of pentaerythritol by the condensation of formaldehyde and acetaldehyde in the presence of an alkaline catalyst and by reacting the product thus obtained with butyraldehyde.

12. A rubber-like composition containing a butadiene copolymer artificial rubber and a dark brown viscous liquid tall-oil ester obtained by reacting tall-oil with a mixture of partial formals of pentaerythritol and polypentaerythritols produced in the manufacture of pentaerythritol by the condensation of formaldehyde and acetaldehyde in the presence of an alkaline catalyst and by reacting the product thus obtained with butyraldehyde in the presence of an acid catalyst.

13. A rubber-like composition containing a butadiene styrene copolymer artificial rubber and a tall-oil ester obtained by reacting tall-oil with a mixture of partial formals of pentaerythritol and polypentaerythritols produced in the manufacture of pentaerythritol by the condensation of formaldehyde and acetaldehyde in the presence of an alkaline catalyst and by reacting the product thus obtained with butyraldehyde.

14. A rubber-like composition containing a butadiene styrene copolymer artificial rubber and a tall-oil ester obtained by reacting tall-oil with a mixture of partial formals of pentaerythritol and polypentaerythritols produced in the manufacture of pentaerythritol by the condensation of formaldehyde and acetaldehyde in the presence of an alkaline catalyst and by reacting the product thus obtained with butyraldehyde in the presence of an acid catalyst.

15. A rubber-like composition containing a butadiene styrene copolymer artificial rubber and a tall-oil ester, substantially free from unreacted butyraldehyde and volatile products, obtained by reacting tall-oil with a mixture of partial formals of pentaerythritol and polypentaerythritols produced in the manufacture of pentaterythritol by the condensation of formaldehyde and acetaldehyde in the presence of an alkaline catalyst and by reacting the product thus obtained with butyraldehyde.

16. A rubber-like composition containing a butadiene styrene copolymer artificial rubber and a tall-oil ester, substantially free from unreacted butyraldehyde and volatile products, obtained by reacting tall-oil with a mixture of partial formals of pentaerythritol and polypentaerythritols produced in the manufacture of pentaerythritol by the presence of an alkaline catalyst and by reacting the product thus obtained with butyraldehyde in the presence of an acid catalyst.

17. A rubber-like composition containing a butadiene styrene copolymer artificial rubber and a dark brown viscous liquid tall-oil ester obtained by reacting tall-oil with a mixture of partial formals of pentaerythritol and polypentaerythritols produced in the manufacture of pentaerythritol by the condensation of formaldehyde and acetaldehyde in the presence of an alkaline catalyst and by reacting the product thus obtained with butyraldehyde.

18. A rubber-like composition containing a butadiene styrene copolymer artificial rubber and a dark brown viscous liquid tall-oil ester obtained by reacting tall-oil with a mixture of partial formals of pentaerythritol and polypentaerythritols produced in the manufacture of pentaerythritol by the condensation of formaldehyde and acetaldehyde in the presence of an alkaline catalyst and by reacting the product thus obtained with butyraldehyde in the presence of an acid catalyst.

ROBERT H. BARTH.

REFERENCES CITED

The following references are of record in the file of this patent:

UNITED STATES PATENTS

| Number | Name | Date |
|---|---|---|
| 2,516,104 | Burrell et al. | July 25, 1950 |